(12) United States Patent
Ojha (10) Patent No.: US 9,092,445 B2
(45) Date of Patent: Jul. 28, 2015

(54) PREDICTIVE INFORMATION TOPOLOGY MODELING AND VISUALIZATION

(75) Inventor: Anurag Ojha, Hyderabad (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 235 days.

(21) Appl. No.: 13/605,005

(22) Filed: Sep. 6, 2012

(65) Prior Publication Data

US 2014/0067779 A1   Mar. 6, 2014

(51) Int. Cl.
*G06F 17/30* (2006.01)

(52) U.S. Cl.
CPC ............................. *G06F 17/30144* (2013.01)

(58) Field of Classification Search
CPC .................... G06F 17/30289; G06F 17/30864; G06F 17/3007; G06F 17/30082; G06F 17/30144
USPC ......................................................... 707/694
See application file for complete search history.

(56) References Cited

U.S. PATENT DOCUMENTS

| | | | |
|---|---|---|---|
| 2008/0208834 A1* | 8/2008 | Boyer et al. ...................... | 707/5 |
| 2010/0185994 A1* | 7/2010 | Pikus et al. | |
| 2011/0219373 A1* | 9/2011 | Nam et al. ........................ | 718/1 |
| 2011/0238805 A1* | 9/2011 | Signori ......................... | 709/223 |
| 2012/0011105 A1* | 1/2012 | Brock et al. ................... | 707/694 |
| 2012/0066378 A1* | 3/2012 | Lui et al. ....................... | 709/224 |
| 2012/0290544 A1* | 11/2012 | Abuelsaad et al. ........... | 707/694 |
| 2013/0054601 A1* | 2/2013 | Whitlock et al. .............. | 707/737 |
| 2013/0103641 A1* | 4/2013 | Rehman ........................ | 707/609 |
| 2014/0143215 A1* | 5/2014 | Chapman et al. ............. | 707/694 |

* cited by examiner

*Primary Examiner* — Etienne Leroux
*Assistant Examiner* — Jared Bibbee
(74) *Attorney, Agent, or Firm* — Volpe and Koenig, P.C.

(57) ABSTRACT

A system and method of ensuring usage-based compliance based on a predicted model topology are disclosed. The system includes an information topology that extracts information from at least one information object, a daemon that operates to monitor interactions with at least one information object, an analyzer that performs a statistical-based pattern analysis using the monitored interactions, and a compliance policy that receives input from the information topology. The compliance policy is adjusted based on the analyzer and any new rules, and compares the actual state to the desired state. The method includes monitoring a file system to capture user interaction with the file system, performing statistical-based pattern analysis on the captured interactions, adjusting a compliance policy based on the statistical analysis and any new rules, inputting an information topology into the compliance policy, and comparing the actual state to a desired state that is based on the adjusted compliance policy.

27 Claims, 11 Drawing Sheets

| Category | Subcategory | Severity | Criticality | Timestamp | Messages |
|---|---|---|---|---|---|
| Network | router | | | 7/12/12 0:00 | Router is under ping of death atatck initiated by internal IP address a.b.c.d |
| usergroup | finance | | | 7/13/12 0:00 | user xxx tried to read restricted file |
| usergroup | Engineering | | | 7/14/12 0:00 | user yyy login failed 5 times |
| Network | Switch | | | 7/15/12 0:00 | Switch with address a.b.c.d is showing unusual huge traffic on port no 8 connected to user yyy , trying to move a very large file |
| Network | Webserver | | | 7/16/12 0:00 | Webserver with ip address x.b.c.d is experiencing death by thousand cuts attack |
| Network | Appserver | | | 7/17/12 0:00 | Appserver with ip address x.b.d.d is experiencing death by thousand cuts attack |
| usergroup | Sales | | | 7/18/12 0:00 | user bbb with IP address q.w.e.r tried Brute attack on password recovery |
| usergroup | Engineering | | | 7/19/12 0:00 | |
| usergroup | Engineering | | | 7/20/12 0:00 | user bbb with IP address tried to copy confidential file |
| usergroup | Marketing | | | 7/21/12 0:00 | user bbb with IP address q.w.e.r tried Brute attack on password recovery |
| usergroup | Engineering | | | 7/22/12 0:00 | user bbb with IP address q.w.e.r tried Brute attack on password recovery |
| Network | Dbserver | | | 7/23/12 0:00 | user bbb with IP address failed login 5 times |

FIG. 11

PREDICTIVE INFORMATION TOPOLOGY MODELING AND VISUALIZATION

FIELD OF THE INVENTION

The present invention is generally directed to predictive information topology modeling and visualization, and in particular, to predictive information topology modeling and visualization for policy assessment, violation detection, and problem determination by usage pattern-based policy prediction.

BACKGROUND

In recent years, corporate policy compliance has become a very important area both from the perspective of corporations and the regulatory environment. Noncompliance can result in substantial monetary and nonmonetary damages. Existing compliance solutions generally have a set of policies based on-access to files, directories and the internet, and based on organization requirements certain files and directories are mapped to a certain set of users. Deviation from this mapping results in a violation and the violation is reported via a reporting function. That is, compliance is based on exceptions to rules set up in the rule engine.

Policy compliance generally is not intuitive, but, instead is reactive and manual. These features cause policy compliance to be error prone. Further, policy compliance is generally text based with no dynamic way to alter the system.

SUMMARY OF EMBODIMENTS

A system and method of ensuring compliance are disclosed. The system includes an information topology that extracts information from at least one information object, a daemon that operates to monitor interactions, an analyzer that performs a statistical-based pattern analysis using the monitored interactions, and a compliance policy that receives input from the information topology. The compliance policy is adjusted based on the analyzer and any new rules, and compares the actual state to the desired state.

The method includes monitoring a file system to capture user interaction with the file system, performing statistical-based pattern analysis on the captured interactions, adjusting a compliance policy based on the statistical analysis and any new rules, inputting an information topology into the compliance policy, and comparing the actual state to a desired state that is based on the adjusted compliance policy.

BRIEF DESCRIPTION OF THE DRAWINGS

A more detailed understanding may be had from the following description, given by way of example in conjunction with the accompanying drawings, wherein.

DETAILED DESCRIPTION

The present invention assesses corporate policy compliance against an information infrastructure that includes a multitude of heterogeneous information management systems that are independently administered by using an information topology. The information topology may be used with usage pattern-based policy prediction.

The system includes an information topology that extracts information from at least one information object, a daemon that operates to monitor interactions, an analyzer that performs a statistical-based pattern analysis using the monitored interactions, and a compliance policy that receives input from the information topology. The compliance policy is adjusted based on the analyzer and any new rules, and compares the actual state to the desired state.

The method includes monitoring a file system to capture user interaction with the file system, performing statistical-based pattern analysis on the captured interactions, adjusting a compliance policy based on the statistical analysis and any new rules, inputting an information topology into the compliance policy, and comparing the actual state to a desired state that is based on the adjusted compliance policy.

Figure 1:
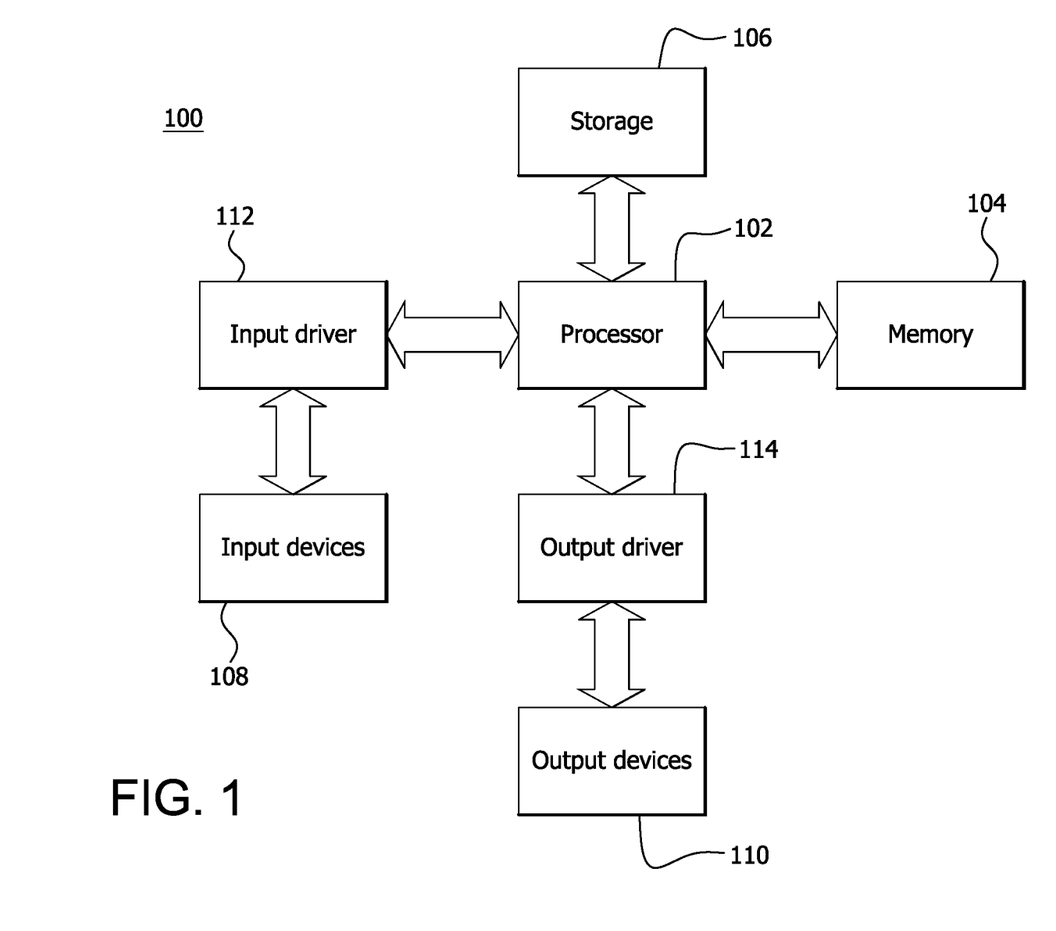
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The information topology may be used with usage pattern-based policy prediction. More specifically, the information topology is created as a graph of nodes representing information objects. Information objects may be routers, switches, intrusion detection system (IDS), application servers, cloud services, web servers, database services, files, and folders, by way of non-limiting example. Information objects may include entities, such as users and groups, as well as the relationships between users and groups. Each node represents the control points in the existing information management infrastructure. Corporate policies may be formally expressed as a comparison of the actual state of the information topology against a desired state. Policies are implemented as a policy graph that is applied to the information topology. The actual state of the information topology is monitored and when policy expressions are violated, the root cause of the problem is determined. Administrators involved with the system may be presented with a visualization of the information topology with policy violations and root causes annotated. An example of this topology is illustrated in FIG. 2.

Figure 2:
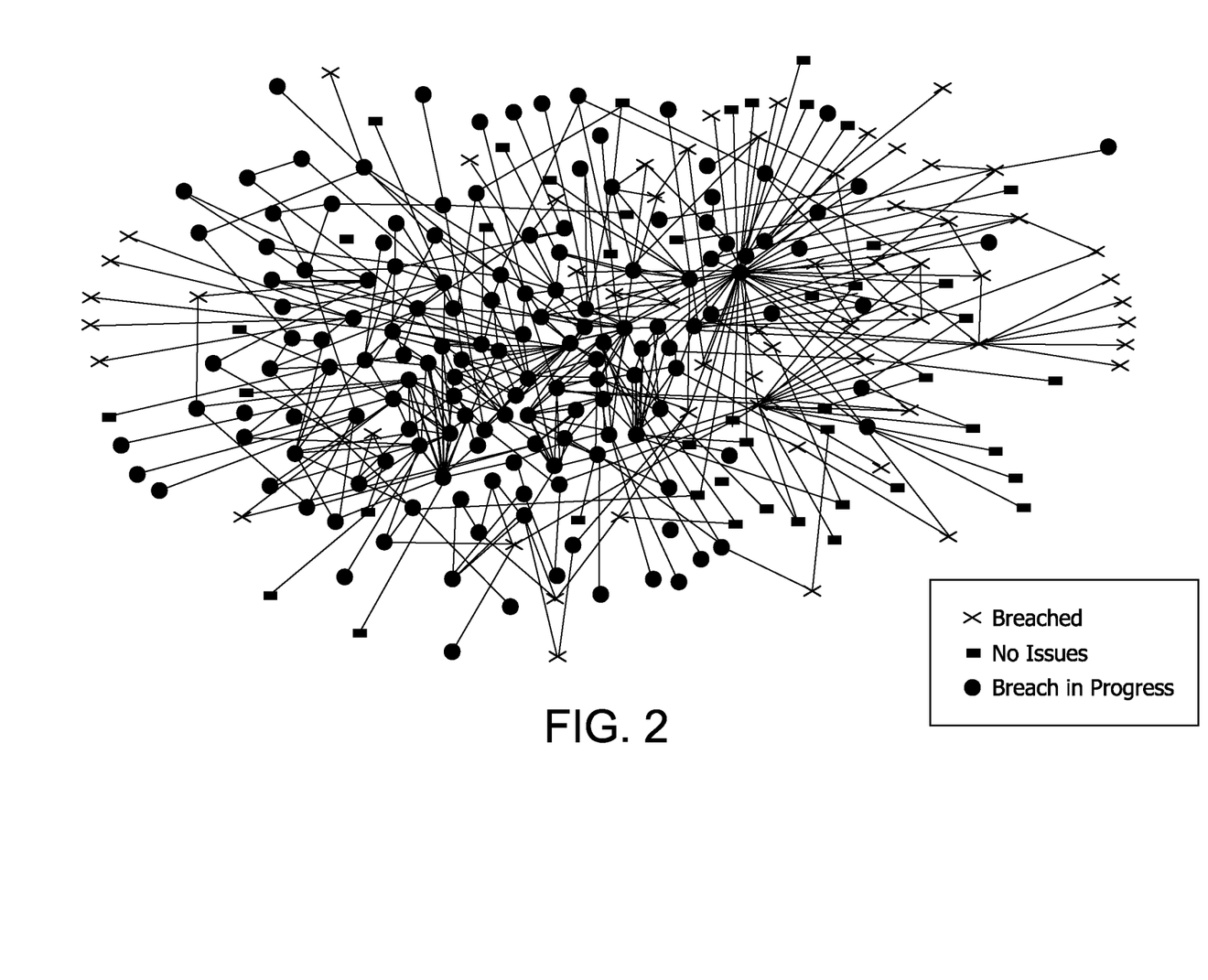
FIG. 2 illustrates a visualization of the information topology with policy violations by depicting a number of endpoints within the system including the status of each of the endpoints.

FIG. 2 shows a number of endpoints within the system, described hereinbelow, and depicts the status of each of the endpoints. In some instances, the endpoints are determined to be breached, others have no issues, and a third category may be a breach in progress. The breach in progress may result from a usage pattern not matching the expected behavior, for example. Other categorizations of endpoints may be shown and specified as would be evident to those possessing an ordinary skill in the pertinent arts. A usage pattern-based policy predictor using I/O statistics may provide proactive intelligent policies for automated management. Such I/O statistics may be based on sampling techniques. A kernel-based statistics manager may record kernel events, such as by collecting information based on I/O types, sequential runs and random runs, quantity, and utilization, by way of non-limiting example.

A user-based daemon may extract and analyze events that are in the system and may be provided with guidance from the predictors described above. In extraction and analysis, the longer the runs, the more data that may be collected and analyzed. The system may learn based on the amount of data that is processed and the larger the variety and type of data, the stronger the correlation of user action to statistical trend that may be achieved.

Statistics that are collected in the present system, such as described above, may be exported to a separate machine and analyzed offline, for example. User policies may be associated with statistical trends and provided back to the system. This feedback may allow the system to learn to associate user actions to statistical trends based on past choices. This knowledge and feedback may allow a protocol to be established for impending catastrophic situations and may provide a data bank to study as a root cause long-term problems that may not be detectable using short-term trends. This knowledge and feedback may provide a statistical model to predict future trends from historical data. The present invention may provide simplified security auditing, vulnerability management and security administration, as well as flexible, scalable n-tier architecture.

Auditing may be provided in multiple different types. For example, there may be on-demand auditing that occurs when regulators ask for information or when individuals desire to have the information. In addition to this classical auditing configuration, another configuration may be used. The second configuration of auditing may include on-access auditing. This type of auditing may include when the users accesses the data and authentication, authorization, and accounting are triggered. This on-access auditing is triggered by the access and the accounting captures the data that may be used for auditing. This type of auditing may be on the fly auditing. The usage pattern of users may create the proactive policy predictor using I/O statistics based on sampling techniques and by providing intelligent data center policies for automated auditing.

Figure 3:
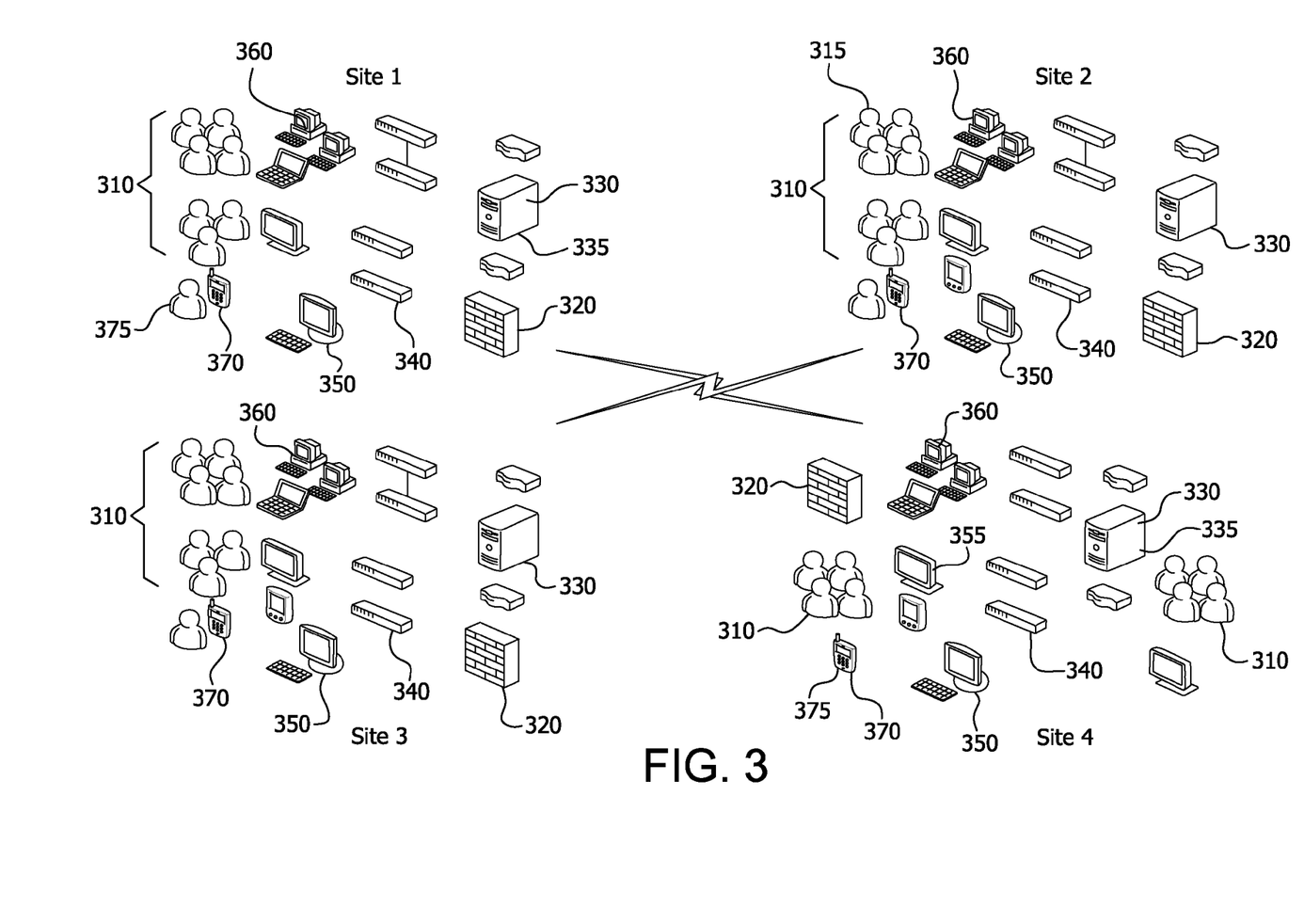
FIG. 3 illustrates a system with four sites of access and data storage.

FIG. 3 illustrates an example system 300 that is distributed over four sites, with four sites of access and data storage. More or less than four sites may be used in an embodiment of the system. Each site, Site 1, Site 2, Site 3, and Site 4, may include users 310 of the system 300 that access files and data of the system 300. The system 300 may also include a firewall 320 at each site. Servers 330, access points 340, terminals 350, computers 360, and personal assistants 370 may each be located at a given site.

As shown in FIG. 3, Site 3 may include at least one of server 330, access point 340, terminal 350, computer 360, personal assistant 370, and user 310 located behind a firewall 320. In the present configuration, each of the devices depicted in Site 3 is running commensurate with expectations. That is, the system 300 has not determined that any device in Site 3 has a problem.

Site 2 is depicted as including similar devices as shown in Site 3. In Site 2, one set of users 315 has been indentified by the system 300 as a possible breach. In this case, the breach may result from the monitoring associated with users 315 as determined by the system 300 that the usage pattern of the users 315 is not matching expected behavior. This may result in the users 315 accessing files from locations that are not normal access points for the users 315, for example.

Sites 1 and 4 depict similar devices as depicted in the other sites. In Site 1, there is a personal assistant 375 that has been and/or caused a breach. A server 335 has a usage pattern that is not matching expected behavior. In Site 4, there is similarly, a server 335 that has been identified as having a usage pattern that is not matching expected behavior. At Site 4, there is a personal assistant 375 that has caused a breach and a terminal 355 that has caused a breach.

By displaying the breaches, potential breaches, and expected behavior in this fashion, the system 300 may enable easy detection and identification of breaches. This presents a visual presentation of the compliance state of various components and nodes across a given configuration, such as within a corporation, for example. The overseer of the organization may determine the root cause of the issue, such as an external breach or the like. This visual depiction may provide a real-time display of data to show any actions that are not expected and that may be causing or are likely to cause harm.

Figure 4:
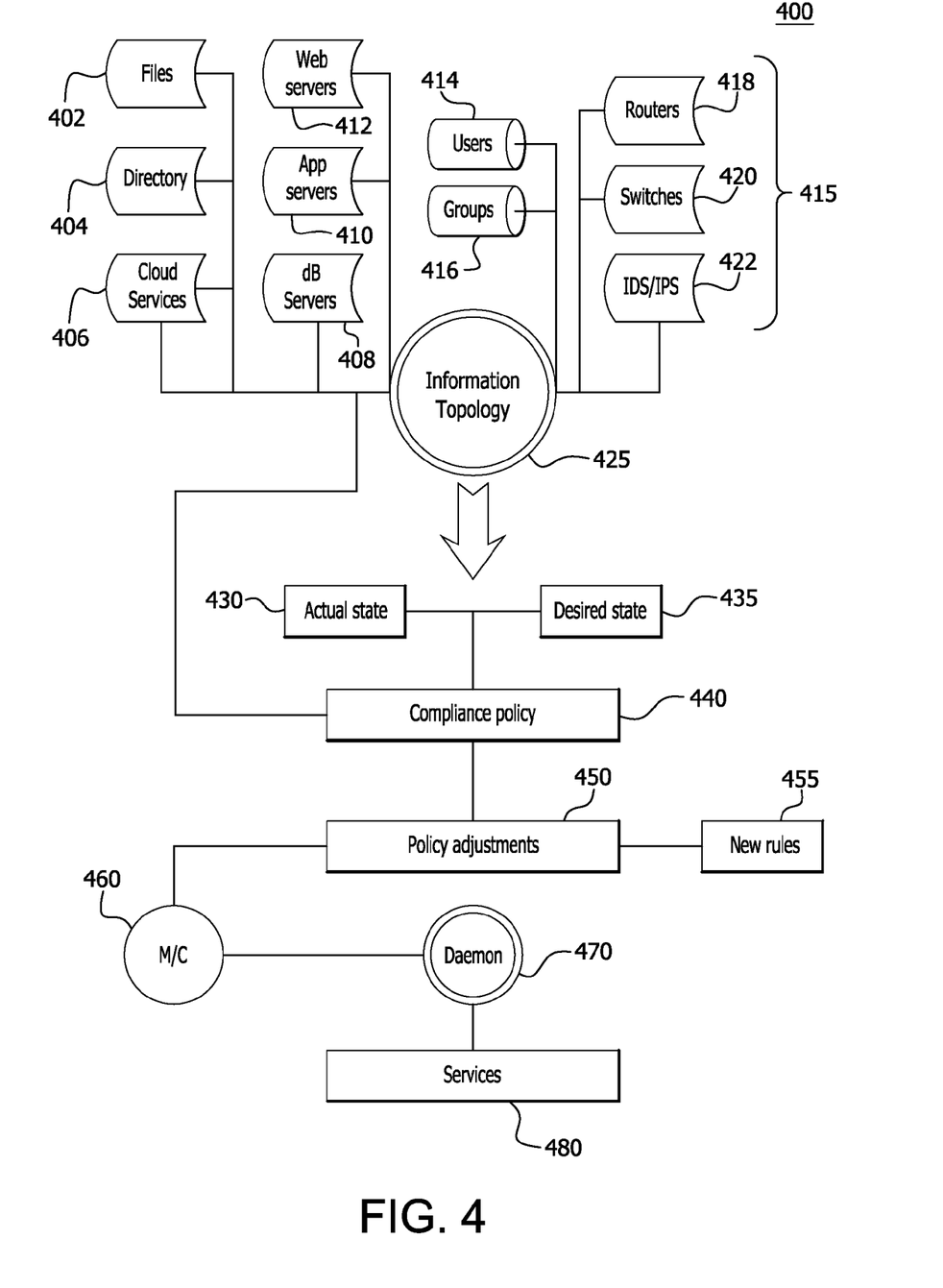
FIG. 4 is block diagram of one or more embodiments of the present predictive information topology modeling and visualization for policy assessment, violation detection, and problem determination by usage pattern-based policy prediction system.

FIG. 4 is system block diagram of one or more embodiments of the predictive information topology modeling and visualization for policy assessment, violation detection and problem determination by usage pattern-based policy prediction system 400. As shown in FIG. 4, the system 400 may include a compliance policy 440 that is fed from an information topology 425 that includes monitoring information objects 415. The information objects 415 may include files 402, directories 404, cloud services 406, database servers 408, application servers 410, web servers 412, users 414, groups 416, routers 418, switches 420, and intrusion detection systems (IDS) and intrusion prevention systems (IPS), collectively IDS/IPS 422. Each node, the top blocks in FIG. 4 including files 402, directory 404, cloud services 406, web servers 412, app servers 410, Db servers 408, routers 418, switches 420, and IDS/IPS 422, in information topology 425 represents the control points in the existing information management infrastructure.

The compliance policy 440 may operate with inputs including the actual state 430 and the desired state 435. A comparison, direct or more loosely performed, may be made to determine if the actual state 430 is aligned with the desired state 435. Corporate policies may be formally expressed as a comparison of the actual state 430 of the information topology 425 against the desired state 435. The compliance policy 440 may be implemented as a policy graph that is applied to the information topology 425. The actual state 430 of the information topology 425 may be monitored and compared to desired state 435. When the policy 440 is violated, the root cause of the problem may be determined.

The compliance policy 440 may receive policy adjustments 450. Such adjustments may be based on new rules 455 implemented in the system 400 and analysis based on statistical-based pattern analysis performed by an analyzer 460. The statistical-based pattern analysis performed by the analyzer 460 may be based on determined policy adjustments 450 and information from daemon 470.

The daemon 470 may be coupled to services 480, and may interact with and provide information to analysis 460. The daemon 470 may extract and analyze events in system 400. The daemon 470 may be user-based and/or guided by predictors. The predictors may include logic modules that are based on the usage patterns of users and use I/O statistics based sampling techniques. In extraction and analysis, the longer that the system 400 operates, the more data that may be accumulated for analysis. The system 400 may learn based on processed data and the larger the variety and type of data, the stronger the correlation of user action to statistical trend that may be achieved.

The analyzer 460 may be a usage pattern-based policy predictor that uses I/O statistics to provide proactive intelligent policies for automated management. The analyzer 460 may provide such policies to policy adjustments 450. I/O statistics may be based on sampling techniques. A kernel-based statistics manager may record kernel events, such as by collecting information based on I/O types, sequential runs and random runs, and quantity, and utilization, by way of non-limiting examples. Statistics that are collected in the system 400 may be exported to a separate machine and analyzed offline, for example. User policies may be associated with statistical trends and provided back to the system.

The compliance policy 440 may be coupled to the information topology 425. This coupling may provide an opportunity for the information topology 425 to learn to associate user interaction to statistical trends based on past choices. This information may be input to the compliance policy 440 from policy adjustments 450 as received from new rules 455, the analyzer 460, and the daemon 470, for example. This knowledge and feedback may allow a protocol to be established for impending catastrophic situations and may provide a data bank to study as root cause long-term problems that may not be detectable using short-term trends. This knowledge and feedback may provide a statistical model to predict future trends from historical data.

Figure 5:
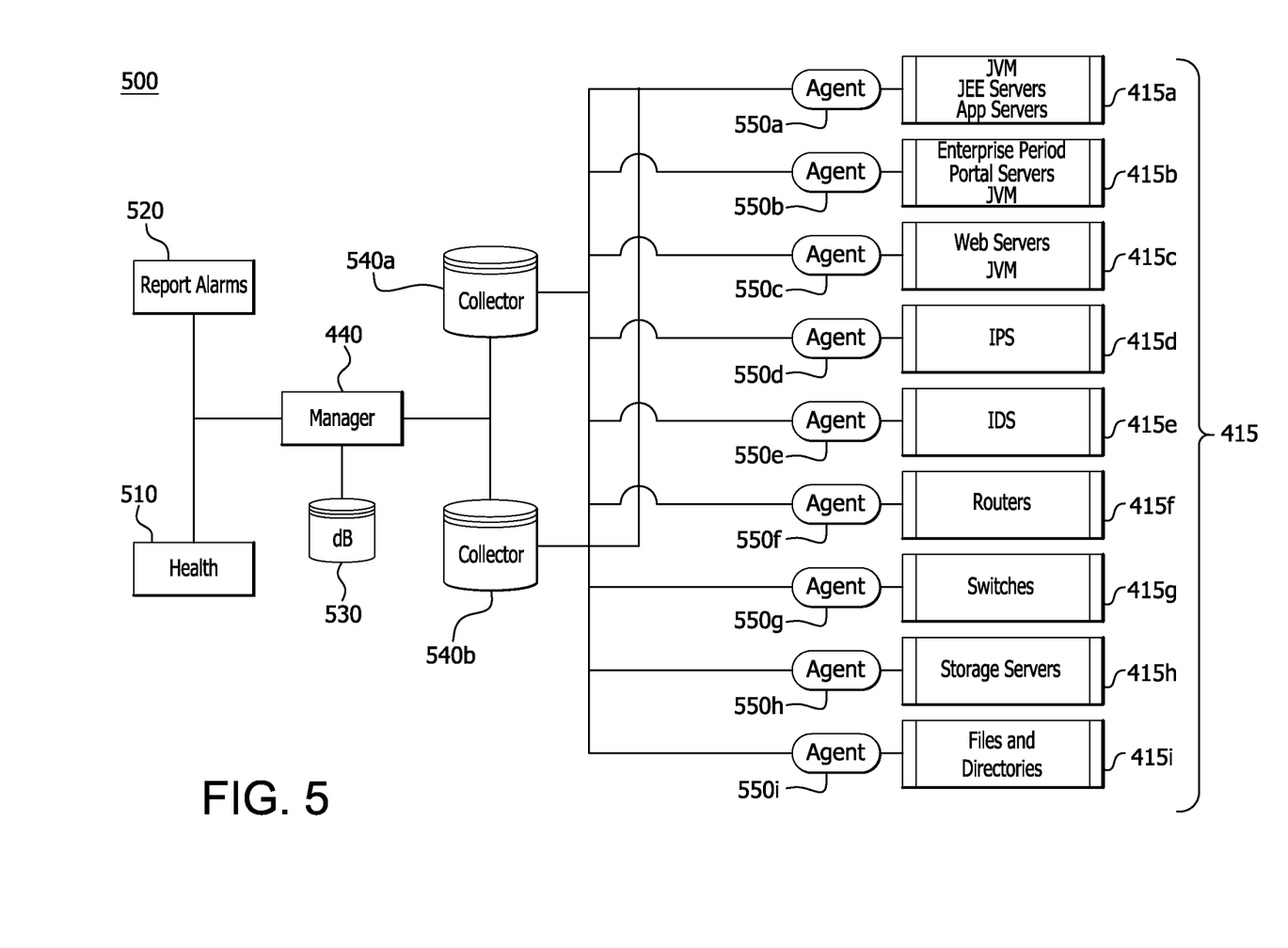
FIG. 5 is a block diagram of the predictive policy compliance architecture of the system of FIG. 4.

FIG. 5 is a block diagram of the predictive policy compliance architecture of the system of FIG. 4. The predictive compliance system 500 of FIG. 5 may include compliance policy 440 as described hereinabove with respect to FIG. 4. A health monitor 510 and an alarm reporter 520 may be interconnected with the manager 440. Also, associated with the manager 440 is a database 530. The manager 440 may interact with one or more collectors 540a, b, . . . , n. Each of the collectors 540a, b, . . . , n may be coupled to one or more information objects 415 using one or more agents 550a, b, . . . , n. While the information objects 415 have been assigned individual reference numbers with respect to FIG. 4, for ease of understanding and reference, the information objects 415 will be shown and discussed with respect to FIG. 5 as information objects 415 and individual objects are referred to as objects 415a, b, . . . , n. While each of the depicted objects 415a-i includes an agent 550a-i, the agent 550 may not be necessary. The agents 550 may be small programs that operate, possibly in the background, on nodes/objects and non-intrusively provide data to the collector 540. As depicted in FIG. 5, the collector 540a may be coupled to each of the information objects 415 via the respective agent 550a-i. The collector 540b may be coupled to selected information objects 415 via agents 550d-i. Each of collector 540a, b may collect information from the information objects 415 and pass the objects to the manager 440 for processing and/or storage in the database 530. The manager 440 may determine that collected information requires an alarm 520 and/or impacts the health 510 of the system.

Figure 6:
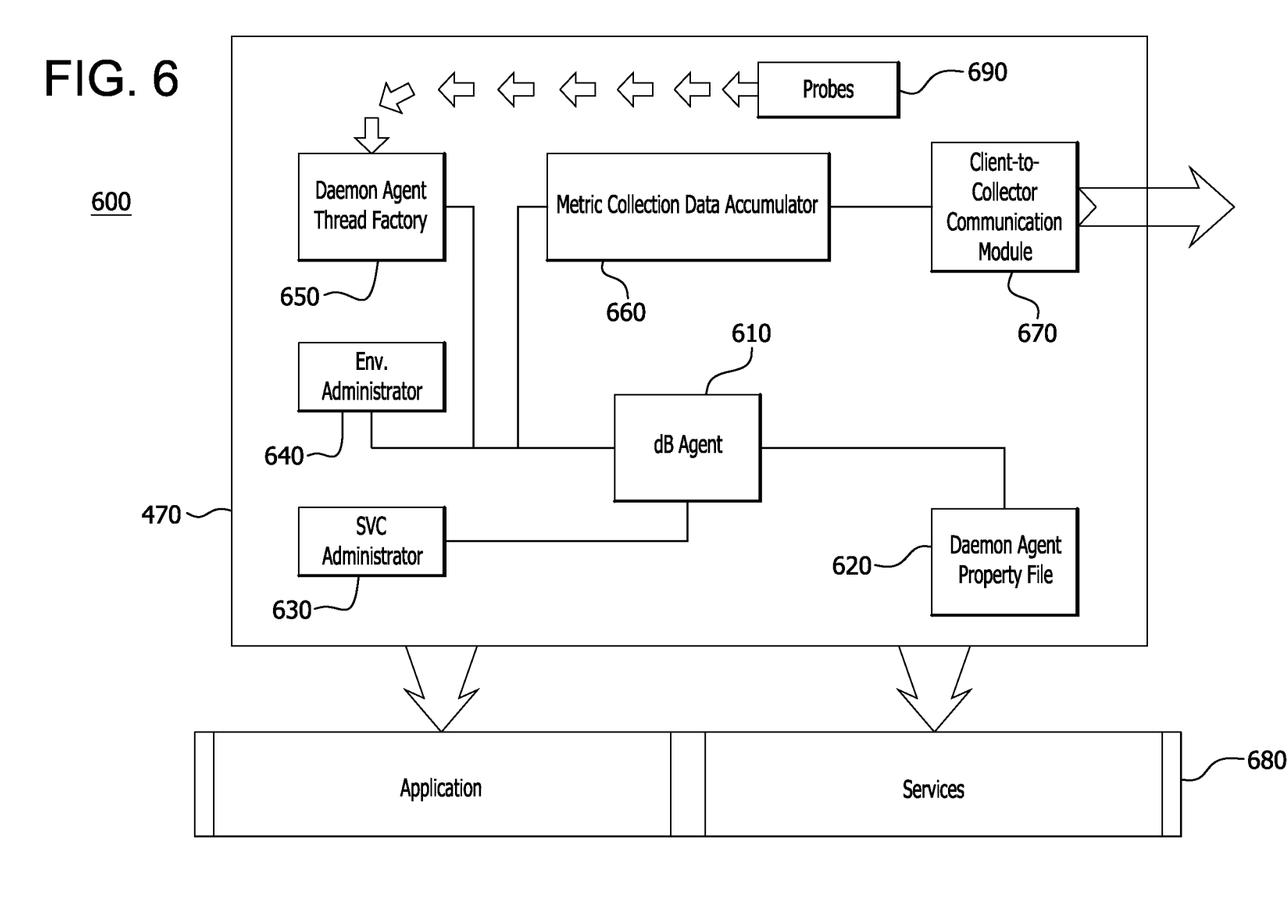
FIG. 6 illustrates a daemon architecture and predictive usage pattern policy engine of the system of FIG. 4.

FIG. 6 is a daemon architecture and predictive usage pattern policy engine 600 of the system 400 of FIG. 4, and includes daemon 470. The daemon 470 may include one or more database agents 610, a daemon agent property file 620, service administrator 630, an environment administrator 640, a daemon agent thread factory 650, a metric collection data accumulator 660, a client-to-collector communication module 670, and probes 690 that provide information to application and services 680. The administrators 630, 640 may provide services required for the system to function including state, stop, pause, and restart in the case of the service administrator 630 and the environment administrator 640 that provides the environment including the clock, memory, priority, for example, in which the service administrator 630 operates.

The daemon 470 may run continuously within the system 400 as described above. The database agent 610 may communicate with each of the environment administrator 640, the service administrator 630, the daemon agent thread factory 650, the metric collection data accumulator 660, and the daemon agent property file 610. The probes 690 may query the daemon agent thread factory 650 and provide information on activities and searches performed. The client-to-collector communication module 670 may receive information from the metric collection data accumulator 660 and may send information to the collectors 540a, b (as shown in FIG. 5). The client-to-collector communication module 670 may also interact with the database agent 610.

Each database agent 610 may be a software agent that operates with the database 530, for example. The agent 610 may be one or more software programs, but may also include communities of interactions by users, by way of non-limiting example. The agent 610 may be autonomous and may be flexible. The agent 610 may communicate with the database 530 without requiring users to understand the protocols and interactions of the database 530. The agent 610 may provide rules that dictate or guide the database 530 and its use. The agent 610 may enable scheduling of tasks associated with the database 530 and may determine the priority of tasks and determine resource usage. Agent 610 may run in the background on nodes/objects and non-intrusively provide the data to the collector 540.

The daemon agent property file 620 may include metadata regarding the agents 610, agent 610 properties, and information regarding agents' 610 operation. The service administrator 630 may provide services that are required for the system to function, such as starting, stopping, pausing and restarting. The daemon agent thread factory 650 may control the functionality of initiating and creating threads, and releasing and killing threads, for example. A thread is a basic unit to which the operating system allocates processor time. The Metric collection data accumulator 660 may provide functionality of collecting and accumulating metrics from the database 530. The databases may contain data dumped by a manager or manager of manager, for example. This data may have been provided by agents 610. The client-to-collector communication module 670 may handle the communication and exchange of data between the clients, such as nodes, and a collector 540.

The probes 690 allow the system to act proactively. Instead of waiting for action and monitoring the action, the probes 690 check the heartbeat of the system and particular setting. The probes 690 may determine if there is some violation occurring and set a flag accordingly.

Figure 7:
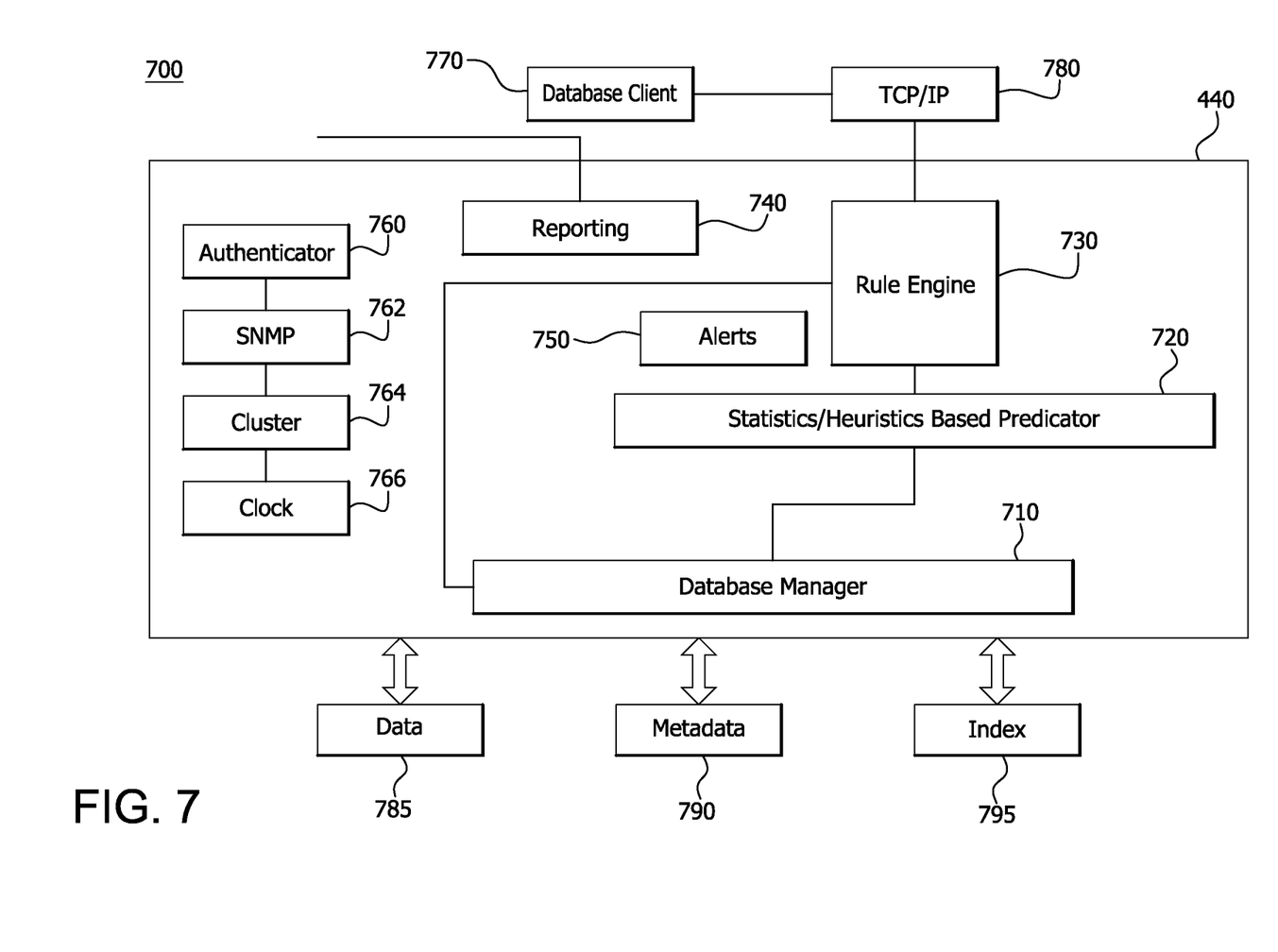
FIG. 7 illustrates a policy manager architecture.

FIG. 7 is an example policy manager architecture 700 including the manager 440. The manager 440 may include a database manager 710, a statistics/heuristics based predictor 720, and a rule engine 730 communicatively coupled. Alerts 750 may be triggered from the database manager 710, the predictor 720, and the engine 730. Reporting 740 may also occur from the manager 440. This reporting may be internal to the manager 440, external thereto, or a combination of internal and external. The manager 440 may include an authenticator 760, a simple network management protocol (SNMP) device 762, a computer cluster 764, and a clock 766. The manager 440 may interact with data 785, metadata 790, and an index 795. The manager 440 may be interconnected to a database client 770 via a TCP/IP 780 connection.

The database manager 710 manages the database, tables, views, stored procedures and data, handles queries, and discovers databases, based on application configuration. The statistics/heuristics-based predictor 720 uses I/O statistics based on sampling techniques to provide proactive policies. The Predictor 720 may use statistical trends as input, and over time the system learns to associate user interaction to statistical trends based on past actions. The predictor 720 may provide a statistical model to predict future trends from historical data.

The rule engine 730 may be configured to monitor and learn rules of user-based access in the predictive topology model. The rule engine 730 may be provided initial rules that operate as an initial rule set. The rule engine 730 may be a collection of rules that are static and/or dynamic. The static rules may be determined from corporate policies, for example. The dynamic rules may come from the statistics/heuristics-based predictor 720.

Alerts 750 may be triggered whenever there is a difference between the expected and actual behavior of the system 400. The alert 750 may change over time as the predictor 720 adds trends based on past actions and new regulations and expectations.

Reporting 740 may also be trigger-based. Reporting 740 may also be based on the rule set that the controlling entity may decide on and may be based on usage patterns. Reporting 740 may also be based on-demand, such as when an entity in the system requests a report.

The grouping authenticator 760 may be an engine that examines credentials as input and may provide a level of access based on the credentials as output.

The (SNMP) device 762 may be an internet-standard protocol for managing devices on IP networks. In the system 400, the SNMP device 762 may provide information about the status of systems, including, for example, if systems are alive or dead.

The cluster 764 may include software that runs on one, some, or all cluster nodes, or even on a different server or cluster of management servers, for example. The cluster 764 may operate in unison with a cluster management agent (not shown in FIG. 7), which runs on a node of the cluster to manage and configure services, assets of services, and/or to manage and configure the complete cluster server.

The clock 766 may assist in ordering of events produced by concurrent processes. The clock 766 may be useful in synchronizing senders and receivers of messages, controlling joint activity, and serializing concurrent access to shared objects. That is, multiple unrelated processes running on different machines may be placed in agreement with and be able to make consistent decisions about the ordering of events in the system 400. The clock 766 may assist in solving the problem that internal clocks on several computers may differ.

The data 785 may include actual raw data. The metadata 790 may include a pointer to the data 785. The Index 795 may be used to allow the data 785 to be searchable. The database manager 710 may use the data 785, the metadata 790, and the index 795 to store the data 785, maintain information about the data 785 including where the data 785 is stored, while using the index 795 to search the data 785. The interaction of the data 785, the metadata 790, and the index 795 is illustrated in FIG. 8.

Figure 8:
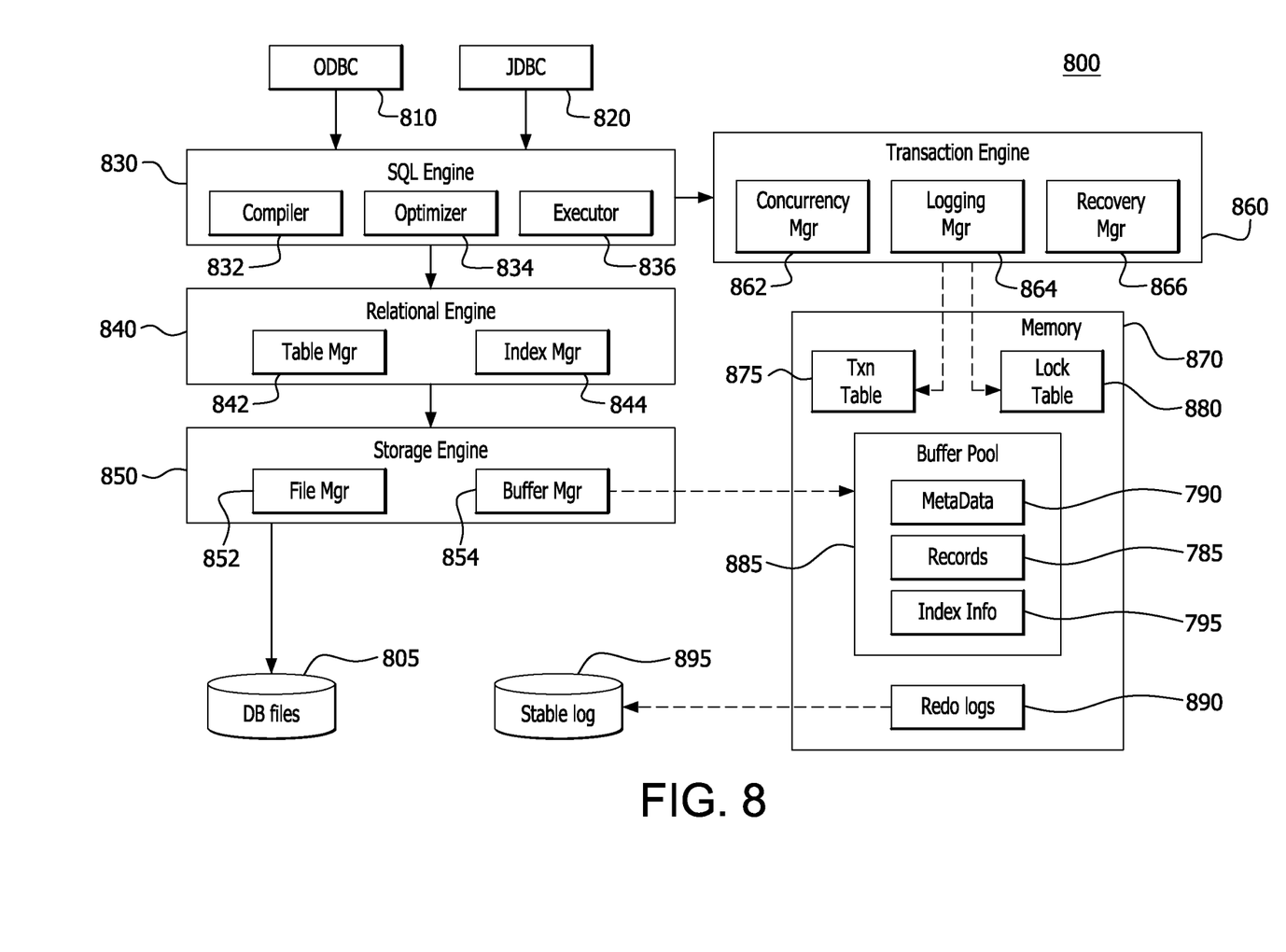
FIG. 8 illustrates a database hierarchy that shows the interaction of data, metadata, and pointer.

FIG. 8 illustrates a database hierarchy that shows the interaction of data 785, metadata 790, and index 795. Database 800 includes open database connectivity (OBDC) 810, Java™ database connectivity (JDBC) 820, a structured query language (SQL) engine 830, a relational engine 840, a storage engine 850, a transaction engine 860, a memory 870, database files 805, and a stable log 895.

Access to the database 800 may be via ODBC 810 and/or JDBC 820. ODBC 810 may be a standard interface for accessing the database 800. This access may be independent of the database 800 and the operating system. JDBC 820 may provide a Java™-based data access technology.

Once accessed, the SQL engine 830 may enable the query to be converted to an SQL query managing relations the database 800. The SQL engine 830 may include a compiler 832, an optimizer 834, and an executor 836 to enable query of the database 800. The SQL engine 830 may be coupled to both the relational engine 840 and the transaction engine 860.

The relational engine 840 may include a table manager 842 and an index manager 844. The table manager 842 may manage tables or a set of data elements determined by relations and organized using columns, rows, and a unique key index. The table manager 842 may include meta-information which may constrain the table or the values within the table. The index manager 844 may manage the index, which is a data structure to aid in improving the speed of data retrieval through tables. The index generally provides the ability for efficient access of ordered records.

The storage engine 850 may store tables managed by the table manager 842 and indices managed by the index manager 844 on a hard disk in one of many forms, such as ordered/ unordered flat files, Indexed Sequential Access Method (ISAM), heaps, hash buckets or B+ Trees, for example. Associated with the storage may be a file manager 852 that manages the storage and maintains information about where information is stored. A buffer manager 854 may also be included within the storage engine 850 with reference to a buffer pool 885.

The transaction engine 860 may include concurrency manager 862, a logging manager 864, and a recovery manager 866. The concurrency manager 862 may ensure that correct results for concurrent operations are generated, while still providing the results timely. The logging manager 864 may control a lock table 880 and a transaction (txn) table 875 of the memory 870. The recovery manager 866 may provide the ability of the database 800 to recover in the case of failure.

The memory 870 may include the txn table 875, the lock table 880, the buffer pool 885, and redo logs 890. Lock table 880 may include the ability to control concurrent access. The lock table 880 may be either shared or exclusive. An exclusive lock grants the user exclusive access to the data, allowing no other user to access the data as long as the lock is held. Shared locks are used when some data is being read, allowing multiple users to read from data locked with a shared lock, but not acquire an exclusive lock. Locks may be applied on different levels of granularity—on entire tables, pages, or even on a per-row basis on tables. For indexes, a lock may either be on the entire index or on index leaves. The level of granularity to be used is defined on a per-database basis by the database administrator. The lock table 880 may be an in-memory table that manages the database objects and locks, if any, along with other metadata about the lock. Access to any shared object is mediated by the logging manager 864, which either grants access to the resource or blocks it. The buffer pool 885 may include metadata 790, records 785, and index information 795.

Figure 9:
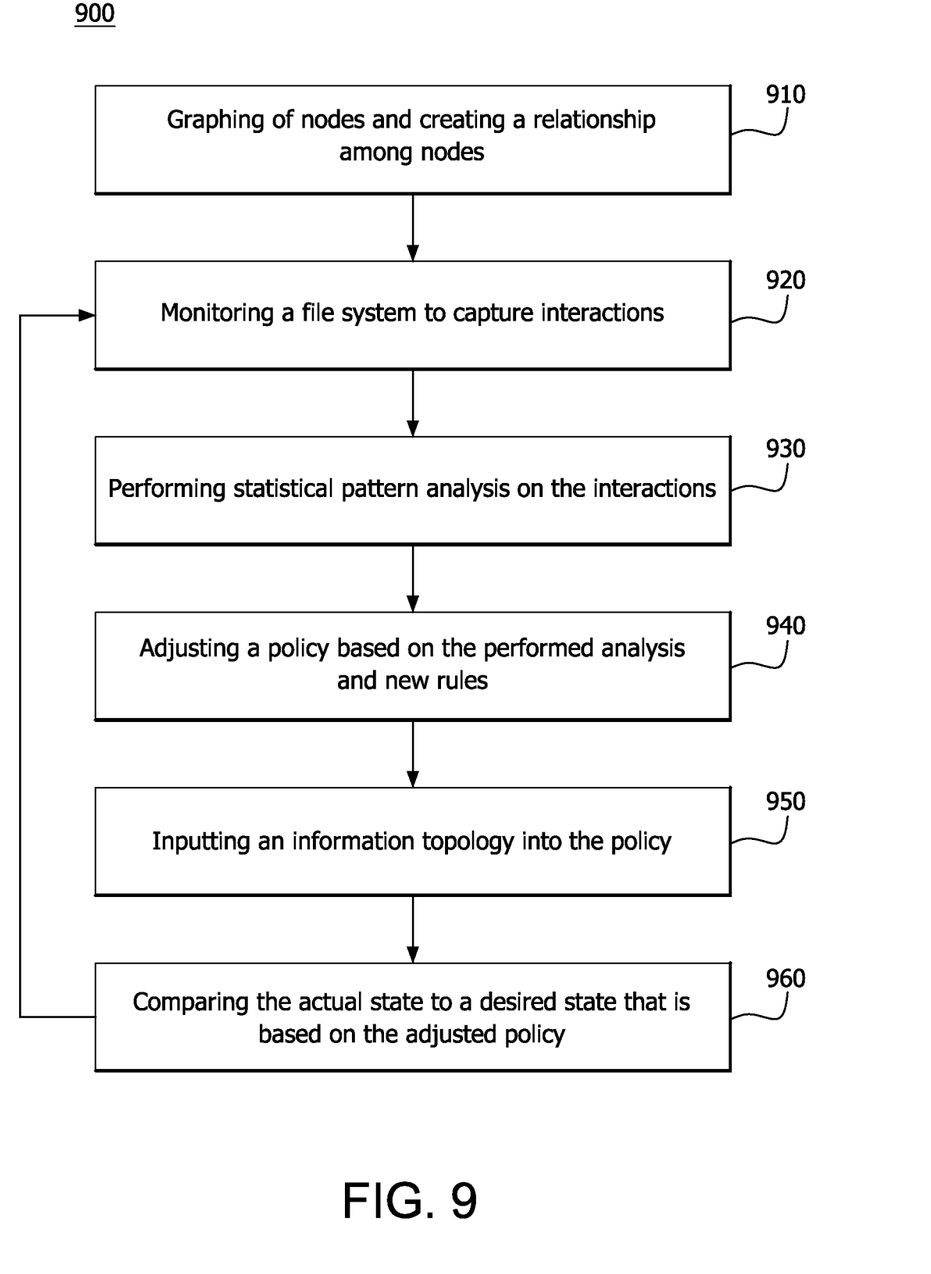
FIG. 9 illustrates a method of ensuring compliance and detecting problems.

A method 900 of ensuring compliance and detecting problems is illustrated in FIG. 9. The method 900 includes graphing nodes and creating a relationship among the nodes, at step 910. A file system is monitored to capture interactions, at step 920. Statistical pattern analysis is performed on the interactions of step 920 at stop 930. A policy may be adjusted based on the performed analysis of step 930 and any new rules to the policy may be added at step 940. Information topology may be input into the policy, at step 950. The actual state based on the information input in step 950 is compared to the desired state that is based on the adjusted policy of step 940, at step 960. A loop may be created from step 960 of comparing the actual state to a desired state based on the adjusted policy back to step 920 of monitoring a file system to capture interactions.

Figure 10:
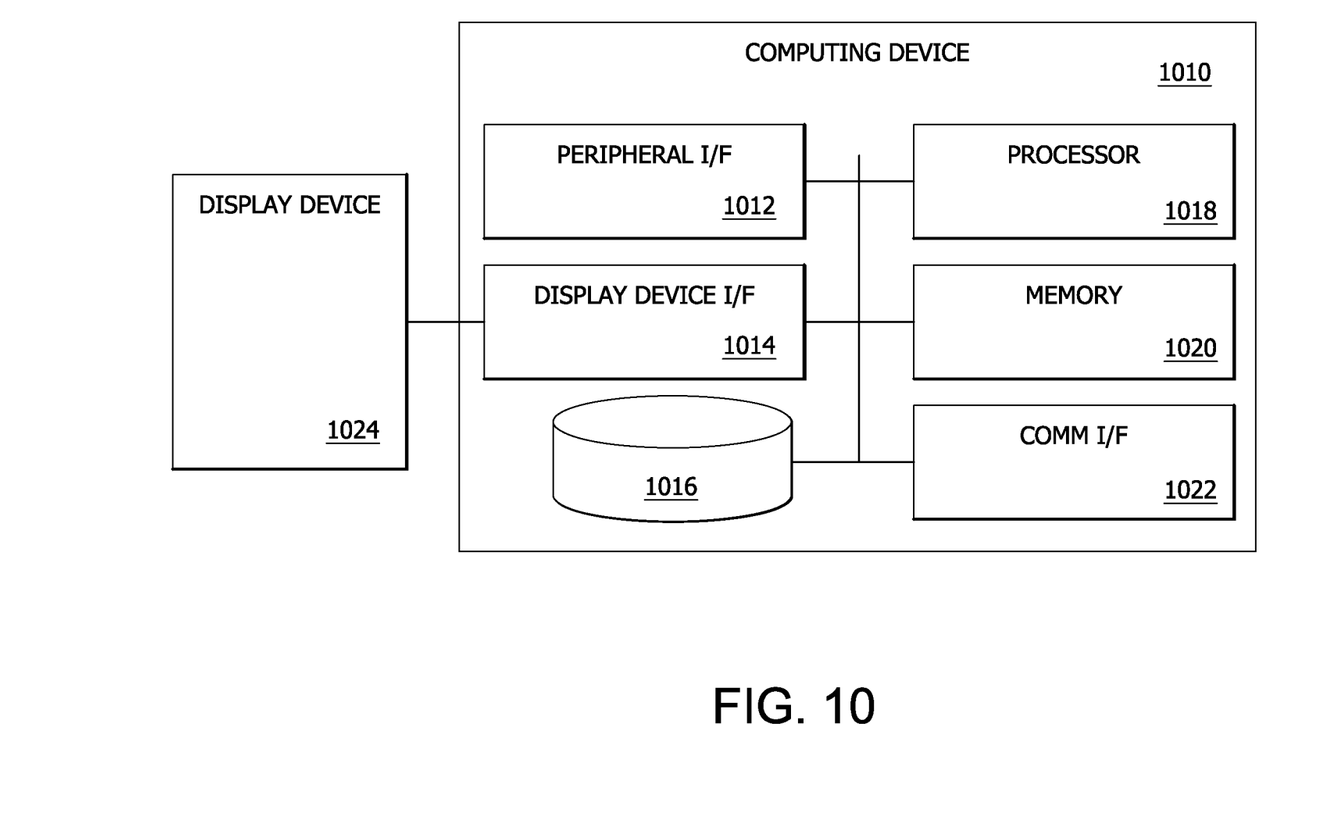
FIG. 10 is an example computing device that may be used to implement features described with reference to FIGS. 1-9.

FIG. 10 shows an example computing device 1010 that may be used to implement features describe above with reference to FIGS. 1-9. The computing device 1010 includes a processor 1018, a memory device 1020, a communication interface 1022, a peripheral device interface 1012, a display device interface 1014, and a data storage device 1016. FIG. 10 also shows a display device 1024, which may be coupled to or included within the computing device 1010.

The memory device 1020 may be or may include a device such as a Dynamic Random Access Memory (D-RAM), Static RAM (S-RAM), or other RAM or a flash memory. The data storage device 1016 may be or may include a hard disk, a magneto-optical medium, an optical medium such as a CD-ROM, a digital versatile disk (DVD), or a Blu-Ray™ disc (BD), or other type of device for electronic data storage.

The communication interface 1022 may be, for example, a communications port, a wired transceiver, a wireless transceiver, and/or a network card. The communication interface 1022 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 1012 is configured to communicate with one or more peripheral devices. The peripheral device interface 1012 operates using a technology such as Universal Serial Bus (USB), PS/2, Bluetooth™, infrared, serial port, parallel port, and/or other appropriate technology. The peripheral device interface 1012 may, for example, receive input data from an input device such as a keyboard, a mouse, a trackball, a touch screen, a touch pad, a stylus pad, and/or other device. Alternatively or additionally, the peripheral device interface 1012 may communicate output data to a printer that is attached to the computing device 1010 via the peripheral device interface 1012.

The display device interface 1014 may be an interface configured to communicate data to the display device 1024. The display device 1024 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1014 may operate using technology such as Video Graphics Array (VGA), Super VGA (S-VGA), Digital Visual Interface (DVI), High-Definition Multimedia Interface (HDMI), or other appropriate technology. The display device interface 1014 may communicate display data from the processor 1018 to the display device 1024 for display by the display device 1024. As shown in Figure 10, the display device 1024 may be external to the computing device 1010, and coupled to the computing device 1010 via the display device interface 1014. Alternatively, the display device 1024 may be included in the computing device 1010.

An instance of the computing device 1010 of FIG. 10 may be configured to perform any feature or any combination of features described above as performed in system 300, 400, and/or access the information objects 415 within system 300, 400. Alternatively or additionally, the memory device 1020 and/or the data storage device 1016 may store instructions which, when executed by the processor 1018, cause the processor 1018 to perform any feature or any combination of features described above as performed in system 300, 400. Alternatively or additionally, each or any of the features described above as performed in system 300, 400 may be performed by the processor 1018 in conjunction with the memory device 1020, the communication interface 1022, the peripheral device interface 1012, the display device interface 1014, and/or the storage device 1016.

Figure 11:
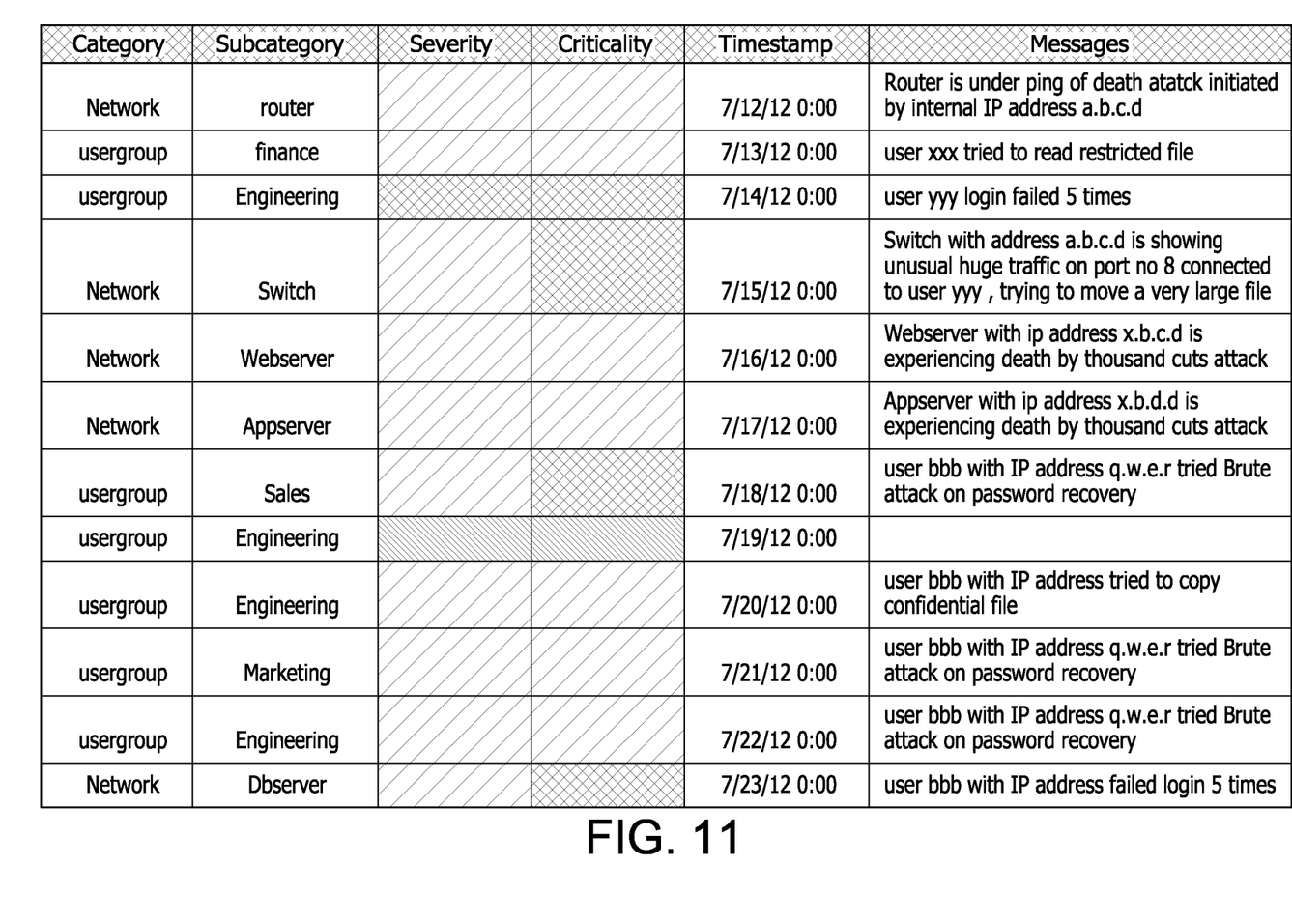
FIG. 11 illustrates a tablet computer that is a more specific example of the computing device of FIG. 10.

FIG. 11 shows a tablet computer 1110 that is a more specific example of the computing device 1010 of FIG. 10. The tablet computer 1110 may include a processor (not depicted), memory device (not depicted), communication interface (not depicted), peripheral device interface (not depicted), display device interface (not depicted), storage device (not depicted), and touch screen display 1124, which may possess characteristics of the processor 1018, the memory device 1020, the communication interface 1022, the peripheral device interface 1012, the display device interface 1014, the storage device 1016, and the display device 1024, respectively, as described above with reference to FIG. 10. The touch screen display 1124 may receive user input using technology such as, for example, resistive sensing technology, capacitive sensing technology, optical sensing technology, or any other appropriate touch-sensing technology.

Depicted on tablet computer 1110 is an audit report providing information on the status of a number of files. The category, severity, time, and message information is displayed. From this report, a user may be able to determine policy assessment, violation detections, and problem determinations using the usage pattern policy-based prediction of system 300, 400.

As used herein, the term "processor" broadly refers to and is not limited to a single-use or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or BD, or other type of device for electronic data storage.

Although the methods and features are described above with reference to the example architecture 300 of FIGS. 3 and 400 of FIG. 4, the methods and features described above may be performed, using any appropriate architecture and/or computing environment. Although features and elements are described above in particular combinations, each feature or element may be used alone or in any combination with or without the other features and elements. For example, each feature or element as described above with reference to FIGS. 1-11 may be used alone without the other features and elements or in various combinations with or without other features and elements. Sub-elements and/or sub-steps of the methods described above with reference to FIGS. 1-11 may be performed in any arbitrary order (including concurrently), in any combination or sub-combination.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system of ensuring usage-based compliance based on a predicted model topology, the system comprising:
    a processor that operates according to a set of instructions, the processor comprising:
    an information topology that extracts information from at least one information object in a predicted model topology;
    a daemon that operates to monitor any of a plurality of interactions with at least one information object;
    an analyzer that performs an analysis of the monitored interactions; and
    a compliance policy that receives input from the information topology, the compliance policy being adjusted based on the analyzer and any new rules in the predicted model topology and compares an actual state of the extracted information to a desired state of the information governed by the compliance policy.

2. The system of claim 1, wherein the actual state includes extracted information concerning at least one information object and is based on monitored interactions by the daemon.

3. The system of claim 1, wherein the desired state includes a definitional determination of the desired value for extracted information concerning at least one information object.

4. The system of claim 1, wherein the comparison results in classifying the extracted information as at least one of breached, no issue, and breach in progress.

5. The system of claim 1, wherein the daemon monitors each information object.

6. The system of claim 1, wherein the monitoring includes probing for at least one of access and modification.

7. The system of claim 1, wherein a pattern analysis includes statistical-based pattern analysis.

8. The system of claim 1, wherein the daemon includes probes to monitor interactions.

9. The system of claim 1, wherein the analyzer records kernel events.

10. The system of claim 9, wherein the kernel events include at least one of I/O types, sequential runs, and random runs.

11. A method of ensuring usage-based compliance based on a predicted model topology, the method comprising:
    monitoring a file system in the predicted model topology to capture interaction with the file system;
    performing analysis on the captured interactions;
    adjusting a compliance policy based on the analysis and any new rules in the predicted model topology;
    inputting an information topology into the compliance policy; and
    comparing on actual state of the file system to a desired state of the file system that is based on the adjusted compliance policy and the captured interactions with the file system.

12. The method of claim 11, wherein the actual state includes extracted information concerning at least one information object and is based on monitored interactions by the daemon.

13. The method of claim 11, wherein the desired state includes a definitional determination of the desired value for extracted information concerning at least one information object.

14. The method of claim 11, wherein the comparing results in classifying the extracted information as at least one of breached, no issue, and breach in progress.

15. The method of claim 11, wherein the monitoring includes probing for at least one of access and modification.

16. The method of claim 11, wherein the analysis includes statistical-based pattern analysis.

17. The method of claim 11, wherein the monitoring is performed by a daemon.

18. The method of claim 17, wherein the daemon monitors each information object.

19. The method of claim 18, wherein each information object is monitored with probes to capture interactions.

20. The method of claim 11, wherein the performed analysis records kernel events.

21. The method of claim 20, wherein the kernel events include at least one of: I/O types, sequential runs, and random runs.

22. A non-transitory computer-readable medium having processor-executable instructions stored thereon which, when executed by at least one processor, will cause the at least one processor to perform a method for ensuring usage-based compliance based on a predicted model topology, the method comprising:

monitoring a file system in the predicted model topology to capture interaction with the file system;

performing analysis on the captured interactions;

adjusting a compliance policy based on the analysis and any new rules in the predicted model topology;

inputting an information topology into the compliance policy; and comparing on actual state of the file system to a desired state of the file system that is based on the adjusted compliance policy and the captured interactions with the file system.

23. The non-transitory computer-readable medium of claim 22, wherein the actual state includes extracted information concerning at least one information object and is based on monitored interactions by the daemon.

24. The non-transitory computer-readable medium of claim 22, wherein the desired state includes a definitional determination of the desired value for extracted information concerning at least one information object.

25. The non-transitory computer-readable medium of claim 22, wherein the comparing results in classifying the extracted information as at least one of breached, no issue, and breach in progress.

26. The non-transitory computer-readable medium of claim 22, wherein the monitoring includes probing for at least one of access and modification.

27. The non-transitory computer-readable medium of claim 22, wherein the analysis includes statistical-based pattern analysis.

* * * * *